United States Patent
Siaud et al.

(10) Patent No.: US 8,462,612 B2
(45) Date of Patent: Jun. 11, 2013

(54) DYNAMIC INTERLEAVING METHOD AND DEVICE

(75) Inventors: Isabelle Siaud, Rennes (FR); Anne-Marie Ulmer-Moll, Rennes (FR)

(73) Assignee: France Telecom, Paris (FR)

( * ) Notice: Subject to any disclaimer, the term of this patent is extended or adjusted under 35 U.S.C. 154(b) by 346 days.

(21) Appl. No.: 12/086,237

(22) PCT Filed: Dec. 7, 2006

(86) PCT No.: PCT/FR2006/051302
§ 371 (c)(1),
(2), (4) Date: Jun. 9, 2008

(87) PCT Pub. No.: WO2007/066044
PCT Pub. Date: Jun. 14, 2007

(65) Prior Publication Data
US 2009/0274035 A1 Nov. 5, 2009

(30) Foreign Application Priority Data
Dec. 7, 2005 (FR) ...................................... 05 53763

(51) Int. Cl.
*H04J 11/00* (2006.01)
(52) U.S. Cl.
USPC ........... 370/208; 370/210; 370/343; 714/701; 714/723; 714/755; 375/260
(58) Field of Classification Search
USPC .................. 370/203–210, 310, 343; 714/701, 714/776, 755, 723; 375/260, 146, 299
See application file for complete search history.

(56) References Cited

U.S. PATENT DOCUMENTS

| | | | |
|---|---|---|---|
| 3,544,775 A * | 12/1970 | Klahn et al. | 702/112 |
| 5,646,935 A * | 7/1997 | Ishikawa et al. | 370/207 |
| 6,278,685 B1 * | 8/2001 | Yonge et al. | 370/203 |
| 6,701,467 B1 * | 3/2004 | Victor | 714/701 |
| 6,704,366 B1 * | 3/2004 | Combes et al. | 375/260 |
| 6,738,948 B2 * | 5/2004 | Dinc et al. | 714/794 |
| 7,210,075 B2 * | 4/2007 | Ferrari et al. | 714/701 |
| 7,376,117 B2 * | 5/2008 | Erlich et al. | 370/343 |
| 7,535,860 B2 * | 5/2009 | Park et al. | 370/310 |
| 2002/0194554 A1 * | 12/2002 | Ferrari et al. | 714/701 |
| 2004/0022179 A1 * | 2/2004 | Giannakis et al. | 370/207 |
| 2004/0066838 A1 * | 4/2004 | Choi et al. | 375/146 |
| 2005/0220199 A1 * | 10/2005 | Sadowsky et al. | 375/260 |

(Continued)

FOREIGN PATENT DOCUMENTS
EP 1 170 917 1/2002
FR 2 854 020 10/2004

OTHER PUBLICATIONS

B. Anuj et al., "TI Physical Layer Proposal for IEEE 802.15 Task Group 3a", IEEE P802.15 Wireless Personal Area Networks, pp. 10-16, May 12, 2003.

(Continued)

*Primary Examiner* — Michael Thier
*Assistant Examiner* — Vincelas Louis
(74) *Attorney, Agent, or Firm* — Cozen O'Connor (57) ABSTRACT

An interleaving method (2) and an interleaver (9) for frequency interleaving data symbols. The data symbols are for allocation to carriers in a set of $N_{FFT}$ carriers of a module for multiplexing and modulation by orthogonal functions in a multicarrier transmitter device (3). A block of Npm successive data symbols is interleaved in application of an interleaving law that varies over time for a given transmission mode of the transmitter device, where Npm is less than or equal to $N_{FFT}$.

19 Claims, 5 Drawing Sheets

U.S. PATENT DOCUMENTS

| | | | |
|---|---|---|---|
| 2006/0039273 A1* | 2/2006 | Gore et al. | 370/208 |
| 2006/0248431 A1* | 11/2006 | Yoon et al. | 714/755 |
| 2007/0127593 A1* | 6/2007 | Lee et al. | 375/299 |
| 2008/0253279 A1* | 10/2008 | Ma et al. | 370/206 |
| 2010/0033355 A1* | 2/2010 | Dinoi et al. | 341/81 |
| 2010/0205510 A1* | 8/2010 | von der Embse | 714/776 |

OTHER PUBLICATIONS

Lei et al., Performance Analysis of Adaptive Interleaving for OFDM Systems, IEEE Transactions on Vehicular Technology, vol. 51. No. 3, May 2002, pp. 435-443.

* cited by examiner

DYNAMIC INTERLEAVING METHOD AND DEVICE

RELATED APPLICATIONS

This is a U.S. national stage under 35 USC 371 of application No. PCT/FR2006/051302, filed on Dec. 7, 2006.

This application claims the priority of French patent application no. 05/53763 filed Dec. 7, 2005, the content of which is hereby incorporated by reference.

FIELD OF THE INVENTION

The present invention relates to the field of telecommunications. Within this field, the invention relates more particularly to so-called digital communications. Digital communications include in particular wireless communications; and they also include, for example, communications by wire. The communications transmission medium is commonly referred to as the transmission or propagation channel, originally with reference to a radio channel, and by extension with reference to any channel.

BACKGROUND OF THE INVENTION

The invention relates to interleaving techniques. These techniques are generally implemented to reduce the correlation that is introduced by a "selective" filtering operation that is inherent to the transmission channel.

The invention applies in particular to any type of multiple carrier transmission system in which the information is put into the form of data symbols (quadrature amplitude modulated (QAM), quadrature phase shift keyed (QPSK), . . . cells) and is multiplexed on an array of subcarriers corresponding to frequency subdivision of the instantaneous bandwidth of the transmission system, which system is subjected to a frequency disturbance that gives rise to the effect whereby a transmission channel has a transfer function H(f,t) that is highly colored and that varies little over time, or else to a system that is subjected to strong Doppler dispersion that generates a loss of orthogonality between subcarriers of a module for multiplexing and modulating by orthogonal functions. Such a module is referred to as an orthogonal frequency division multiplexing (OFDM multiplex) module for a device that multiplexes modulated symbols on subcarriers that correspond to the conjugate Fourier components of a Fourier transform of size $N_{FFT}$ that corresponds to the number of subcarriers of the OFDM multiplex. On transmission, the useful OFDM signal in its time representation is made up of $N_{FFT}$ samples and, for each sample, is the result of summing complex symbols modulated by the conjugate Fourier components. On reception, projecting the OFDM signal onto the corresponding Fourier components and integrating over all of the samples of the OFDM signal provides an estimate of one of the symbols of the OFDM multiplex. By analogy, a module for multiplexing and modulating the transmitted symbols by orthogonal functions is also referred to below in this document by the term orthogonal multiplex. When the number of data symbols given by the orthogonal multiplex is less than the number of orthogonal functions, a null symbol is placed in the center, and null symbols are placed at the ends of the orthogonal multiplex in symmetrical manner. The transmission channel, also referred to as a multipath channel, is represented by the impulse response h(t,□) of a digital filter in which t represents the time variable and □ represents the delay variable associated with the coefficients of the filter at instant t. The transmission channel filters the multicarrier signal by weighting each symbol by the transfer function of the channel as resolved onto the OFDM multiplex. On reception, it generates correlations of the subcarriers in the frequency and time domains. The frequency correlation affects the subcarriers, and the time correlation gives rise to subcarriers of amplitude that is quasi-constant over an observation window having a duration of the same order as the coherence time of the channel. The coherence time corresponds to the mean value of the time difference needed to ensure decorrelation between the signal representative of the transmission medium and its time-shifted version.

These two correlations put a limit on the performance of decision circuits on reception.

The time correlation gives rise to bursts of errors after deciding transmitted data symbols and after decoding estimated transmitted bits. These effects are encountered when the environment is varying slowly and is a multipath environment. This applies in particular for ultra wide band (UWB) systems, for radio systems dedicated to the radio local loop (Wi-max and digital enhanced cordless telecommunications (DECT)), or for transmission of the xDSL type (DSL: digital subscriber loop).

Frequency correlation is the result of the multipath effect that introduces filtering, of the Doppler effect, and of phase noise in the radiofrequency (RF) stages acting simultaneously and giving rise to a loss of orthogonality between the subcarriers of an orthogonal multiplex. This applies in particular to short-range systems defined in the millimeter band as specified by the American Standards Organization in IEEE802.15.3c, and also in highly mobile systems or in very long-range systems dedicated to ionospheric radio links (Digitale Radio Mondiale (DRM) system standard ETSI TS 101 980).

A method of remedying those two correlations consists in performing interleaving on transmission that is performed on the binary data or on the data symbols.

Interleaving techniques in a transmission system are thus applied to the data items in order to decorrelate the data items as received and improve the decision-making circuits.

At binary level, when the system is associated with a redundancy device, the interleaving techniques applied after the redundancy operation serve to reduce the size of the error bursts. Interleaving is said to be "binary" when it applies to encoded bits, or to bits extracted directly from the source, which bits are referred to as scrambling bits.

Interleaving is said to be "frequency" interleaving when it applies to complex symbols (QPSK, x-QAM, . . . ) allocated to the subcarriers of an orthogonal multiplex, and its size is equal to the number of data symbols per orthogonal multiplex. Interleaving is always performed on the useful data of the transmission device with a static interleaving law for each transmission mode defined by the number of modulation states, the type of encoding, etc. . . . The term "useful" data is used to mean the transmitted data conveying an information message and not including the data that is dedicated to signaling and identification. Below, in this document, the term "data" is used to designate useful data.

The invention relates more particularly to frequency interleaving, i.e. to interleaving performed in the frequency domain on symbols allocated to the carriers of an orthogonal multiplex. This type of interleaving takes place at the input to an orthogonal multiplex. In equivalent manner, reference is commonly made to carrier or subcarrier interleaving.

Document ETSI 300 401, "Radio broadcasting systems: digital audio broadcasting (DAB) to mobile, portable, and fixed receivers", May 1997, p. 182, gives a description of the frequency interleaver of the DAB multicarrier system. That constitutes frequency type interleaving performed at the scale of an OFDM multiplex since the permutation law P(i) takes account of the size $N_{FFT}$ of the FFT of the OFDM multiplex. It is applied to the data symbols of the system corresponding to QPSK symbols.

For a given transmission mode, the interleaving law transforms a QPSK symbol $q_{1,n}$ into a new symbol $y_{1,k}$ where k is the index of the carrier after interleaving, n is the index of the carrier before interleaving, and 1 is the number of the OFDM symbol in the DAB frame transmitted at instant $(1-1)T_{SYM}$, where $T_{SYM}$ designates the total duration of an OFDM symbol together with a guard interval. The interleaving law applied to the symbols allocated to the carriers of the OFDM multiplex and specified by the subcarrier interleaving law, is a law of the form k=F(n) where k is the index of the data carrier in the OFDM multiplex. The index k varies over the range {−Npm/2, Npm/2}\{0} and the index n varies over the range [0, Npm−1]. Npm corresponds to the number of data subcarriers per OFDM multiplex. The interleaving law is extracted from an alphabet A that takes account of the size $N_{FFT}$ of the OFDM multiplex. An interleaving law P(i) is defined initially for i={0, $N_{FFT}$−1} taking the values A={P(0), P(1), . . . , P($N_{FFT}$−1)} in the integer space I={0, $N_{FFT}$−1} in application of a law P(i) having the form:

$$P(0) = 0 \quad (1)$$

$$P(i) = \left[13 \cdot P(i-1) + \left(\frac{N_{FFT}}{4} - 1\right)\right]_{N_{FFT}},$$

$$i = \{0, \ldots N_{FFT} - 1\}$$

The operation $[X]_{NFFT}$ corresponds to the modulo $N_{FFT}$ operation that provides the remainder of dividing X by $N_{FFT}$. The values P(i) that are strictly less than Q=($N_{FFT}$−Npm)/2 and that are strictly greater Npm+Q are eliminated, as is the value $N_{FFT}$/2 that corresponds to the central carrier.

The data is then distributed in increasing order i in a vector D={d0, d1, . . . , $D_{Npm-1}$} taking its values in the interval I'={0, . . . , Npm−1}.

Figure 1:
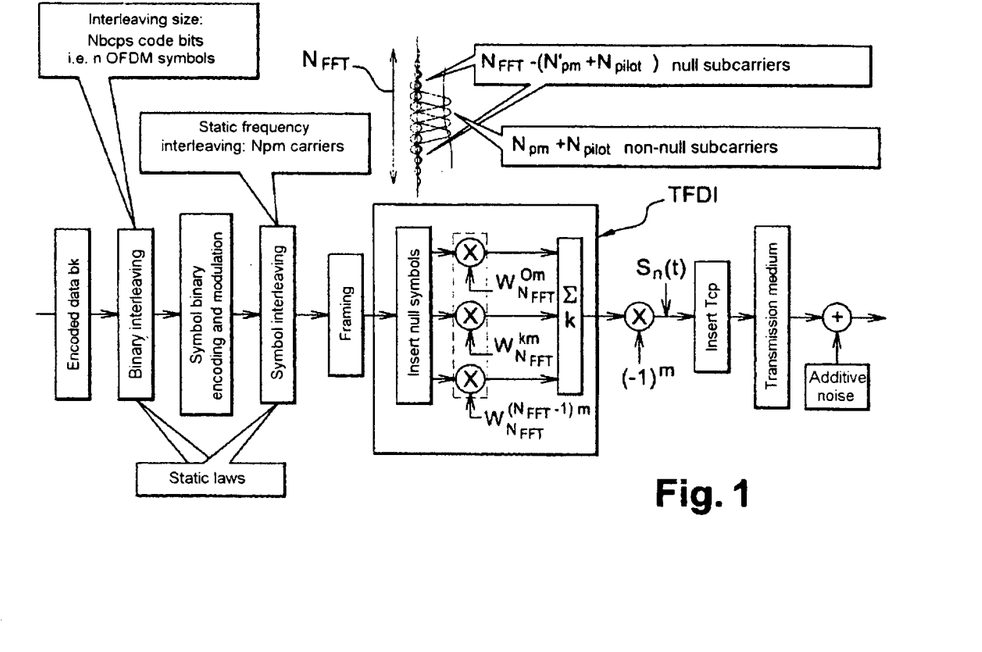
FIG. 1 is a diagram showing a prior art interleaving method.

The correspondence F(n)=dn−$N_{FFT}$/2 is performed to distribute the subcarriers between the indices {−Npm/2 and Npm/2} excluding the index 0 for the central carrier. The process of interleaving the subcarriers corresponds to the diagram of FIG. 1. This figure shows the general principle of interleaving subcarriers in conventional systems of the OFDM type.

The interleaved data symbols are then put into frames and then distributed over the OFDM multiplex prior to transmission. The transmission channel filters the transmitted signal, thereby giving rise to correlation between data symbols. On reception, the deinterleaving operation on the data symbols upstream from the decision circuits then makes it possible to obtain data with reduced correlation at the input to the decision circuits. Nevertheless, for corresponding systems, the interleaving period is generally short compared with the coherence time of the channel and error bursts persist at the output from the decision circuit.

SUMMARY OF THE INVENTION

One object of the present invention is to provide a frequency interleaving method that is more effective than prior art methods for a transmitter device including a module for multiplexing and modulation by orthogonal functions known as an orthogonal multiplex, and in particular for an OFDM multiplex.

In order to attain this and other objects, one aspect of the present invention is directed to a method of frequency interleaving symbols that are to be allocated to carriers of a multicarrier transmitter device comprising a module for multiplexing and modulation by $N_{FFT}$ orthogonal functions, the method comprising interleaving a block of symbols in application of a determined block interleaving law that is variable over time for a given transmission mode of the multicarrier transmitter device.

Another aspect of the present invention is directed to a frequency interleaver of symbols that are to be allocated to carriers in a multicarrier transmitter device comprising a module for multiplexing and modulation by $N_{FFT}$ orthogonal functions in order to interleave a block of symbols in application of a determined interleaving law, the interleaver comprising a calculator device for calculating the interleaving law, in such a manner that the calculated block interleaving law is variable over time for a given transmission mode of the multicarrier transmitter device.

The invention also provides a transmitter device including a frequency interleaver as defined above, and a receiver device including a deinterleaving module for deinterleaving demodulated symbols in application of a law that is the inverse of an interleaving law, the module being suitable, at determined instants, for calculating the deinterleaving law, the interleaving law varying over time for a given transmission mode.

A method according to an embodiment of the invention that relates to a frequency deinterleaving method comprising using a law that differs over time for a given transmission mode, thus makes it possible to generate artificial variability over time in the transmission channel, thereby imparting statistical properties thereto that tend towards Gaussian noise. This make it possible to reduce the time correlation affecting a transmission system in which the data symbols are multiplexed and then modulated, and in particular affecting an OFDM system, and consequently makes it possible to improve decision-taking on reception; the efficiency of the system is thus improved. Unlike known methods in which the interleaving law is static for a given transmission mode, here the interleaving law is dynamic.

In a particular embodiment, the variation over time in the interleaving law depends on a time index of the symbols of the orthogonal multiplex. These symbols posses both an index associated with the positions of the carriers in the orthogonal multiplex, and an index associated at the instant of transmission of an orthogonal signal in a time pattern. This signal is referred to below herein by the term "modulated orthogonal symbol". In particular, the interleaving law can vary after modulating a block of N modulated orthogonal symbols, typically N OFDM symbols, where N is a parameter that is typically determined as a function of the properties of the transmission channel and of the framing of the data, N≧1. In another particular implementation, the interleaving applies to a block of M symbols and the variation over time in the interleaving law occurs after interleaving the block of M symbols. More particularly, M is a multiple of the number Npm of data carriers of the orthogonal multiplex, with Npm≦$N_{FFT}$, and it is a submultiple of N. In a particular embodiment, the variation over time in the interleaving law takes place after interleaving N' blocks of M symbols each.

In particular advantageous manner, the interleaving method of the invention may also serve to emphasize the simultaneous modification of the coherence bandwidth which relates to the frequency domain of the orthogonal multiplex, where the coherence bandwidth of the channel corresponds to the mean value of the frequency spacing required to ensure decorrelation between two frequency components of the transfer function of the transmission channel, and of the coherence length, which relates to the time or space domain of the transmission channel, so as to reduce the impact of the RF stages. For this purpose, in particular, the method performs dynamic block interleaving on a block made up of data symbols for an orthogonal multiplex together with null symbols previously inserted at the ends of the block. This has the specific effect of introducing null symbols in the passband of the orthogonal multiplex, typically an OFDM orthogonal multiplex, at positions that vary over time because of the dynamic interleaving.

The dynamic interleaving, e.g. varying over time every N modulated orthogonal symbols, is performed on a block of N'pm symbols made up of non-null data symbols and of null symbols, said block corresponding at the orthogonal multiplex level to N'pm subcarriers of a modulated orthogonal symbol, typically an OFDM symbol. N'pm lies between Npm, the number of data carriers, and $N_{FFT}$, the size of the orthogonal multiplex. Typically, the interleaving law is static for N modulated orthogonal symbols, typically OFDM symbols, and is applied to a carriers, and $N_{FFT}$, the size of the orthogonal multiplex. Typically, the interleaving law is static for N modulated orthogonal symbols, typically OFDM symbols, and is applied to a block of N'pm symbols. These symbols are allocated to carriers of a group made up of the data carriers of a modulated orthogonal symbol, typically an OFDM symbol, and by a fraction of the null carriers located at the ends of the spectrum of the modulated orthogonal symbol, typically an OFDM symbol.

Thus, interleaving makes it possible to insert null carriers into the useful band of the orthogonal multiplex, in particular an OFDM multiplex. This insertion of null carriers reinforces the effect of modifying the properties of the transmission channel as obtained by the dynamic interleaving, by shifting these null carriers to positions that vary within the passband of the system. The total spectrum efficiency of the system, i.e. the ratio of useful data rates to the total bandwidth of the system is unmodified since the method makes use of null carriers located at the ends of the spectrum. Thus, unlike known interleaving devices, which, given their poor efficiency in the face of Doppler variations, are applied in practice only to useful data for transmission and not to data dedicated to signaling, to transmission channel estimation, or to synchronization, a method of the invention can make use of non-useful data, a fraction of the null carriers of an orthogonal multiplex.

Incorporating null carriers in the passband of the system improves carrier decorrelation and reduces the loss of carrier orthogonality, in particular when the transmission channel is dispersive, in particular by increasing the spacing between carriers in the vicinity of a null carrier in the orthogonal multiplex. Such a method makes it possible to modify the properties of the transmission channel in the time and frequency domains, and simultaneously makes it possible to reduce the frequency correlation and the time correlation affecting a system, in particular an OFDM type system. The method is found to be particularly advantageous for short-range systems delivering high data rates and thus requiring shallow interleaving to be performed upstream of the invention. This applies to ultra wide band systems such as the system defined by the 802.15.3a TG working group constituted by the MBOA Alliance, having the reference "Physical layer submission to 802.15 task group 3a: multiband orthogonal frequency division multiplexing", MBOA website, Sep. 14, 2004, for systems defined in the millimeter band (wide band and ultra wide band) or for radio local loop type systems as defined in IEEE Standard 802.16-2004, IEEE Standard for Local and Metropolitan Area Networks, Part 16: Air interface for fixed broadband wireless access systems, October 2004. The method is also found to be pertinent for systems that are subjected to high Doppler dispersion. Incorporating null carriers at positions that vary over time makes it possible to reduce the loss of orthogonality between carriers while whitening the disturbance the transmission channel generates on the communications signal. Typically, the number of null symbols added during frequency interleaving is adjusted on the basis of a priori knowledge of the correlation properties of the transmission channel and of the number of null carriers conventionally added during OFDM modulation.

The fact that the added symbols are nulls makes it possible to avoid introducing additional noise.

In a particular implementation, the combined modification is obtained by means of an iterative interleaving algorithm applied to the null symbols and to the data symbols, using an interleaving law that varies for example depending on the iteration under consideration. This algorithm constitutes the subject matter of a French patent application No. FR 04/14113. Typically, after N modulated orthogonal symbols, the algorithm makes use of an interleaving law that differs by the number of iterations or by the interleaving parameters, depending on the overall optimizations and constraints of the transmission system.

An interleaving law I(k) for a block of size K is a bi-jective function that gives the order in which an input sequence made up of K data items indexed by an index k varying over the range 0 to K−1 ought to be read on output. Let X(k) be a sequence at the input to an interleaver having interleaving law I(k). Let Y(k) be the output sequence from the interleaver. Then Y(k)=X(I(k)): the $k^{th}$ data item of the interleaved sequence having position index k−1 corresponds to the data item of index I(k−1) of the input sequence X(0), ..., X(K−1). The data items at the input to the interleaver and the interleaved data items at its output are represented below solely by their indices k, unless specified to the contrary.

According to another example embodiment, an article of manufacture comprises a non-transitory computer readable medium storing a computer program including software code portions for executing steps of a method of the invention when the program is executed by an electronic device.

Figure 2:
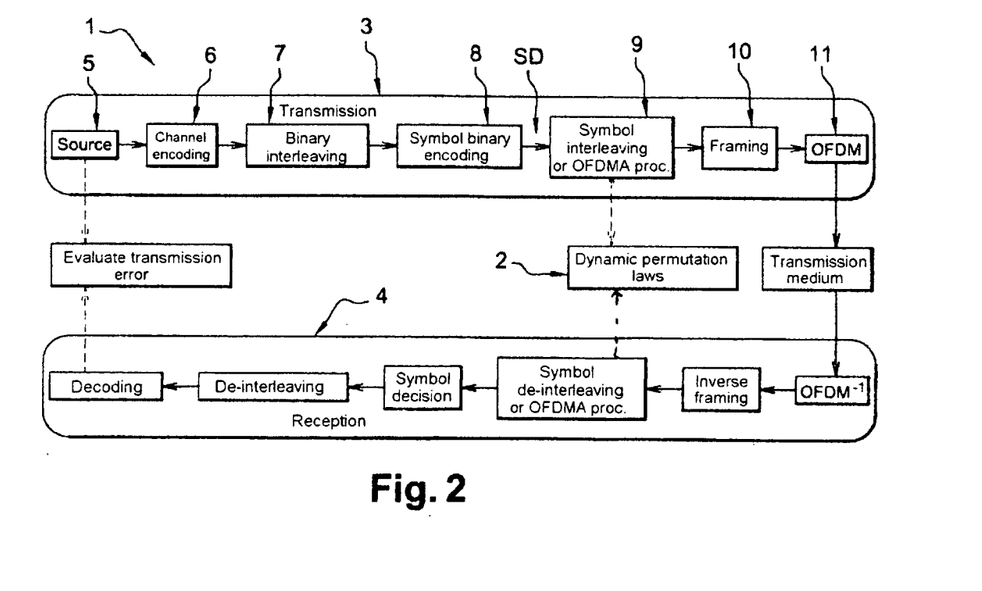
FIG. 2 is a diagram of one particular transmission system with interleaving of the invention.

FIG. 2 is a diagram showing an example of a transmission system 1 implementing an interleaving method 2 of the invention. The transmission system comprises a multicarrier transmitter device 3 and a receiver device 4. The transmitter device 3 comprises a source data generator module 5, a channel encoder module 6, a binary interleaver module 7, a symbol binary encoder module 8, a frequency interleaver 9, a framer device 10, and an OFDM modulator 11 that includes an OFDM multiplex.

The symbol frequency interleaver 9 comprises in particular a device for calculating the interleaving law such that the calculated block interleaving law is variable over time for a given transmission mode of the multicarrier transmitter device 3. The framer device 10 distributes the data symbols and the pilot symbols in the multiplex.

The receiver device 4 comprises a deinterleaver module that performs deinterleaving of the demodulated symbols in application of a law that is the inverse of the interleaving law. At determined instants, the deinterleaver module is suitable for calculating the deinterleaving law that varies over time for a given transmission mode.

An interleaving method 2 of the invention is implemented by the frequency interleaver 9 of the transmitter device 3. It is applied to the data symbols SD coming from the symbol binary encoding.

The method 2 interleaves successive data symbols SD in application of a determined interleaving law. According to the invention, the interleaving law varies over time for a given transmission module. The data symbols SD interleaved by the interleaving method are allocated to one or more sets of Npm data carriers of the OFDM multiplex.

The OFDM multiplex comprises $N_{FFT}$ carriers, where $Npm \leq N_{FFT}$.

Figure 3:
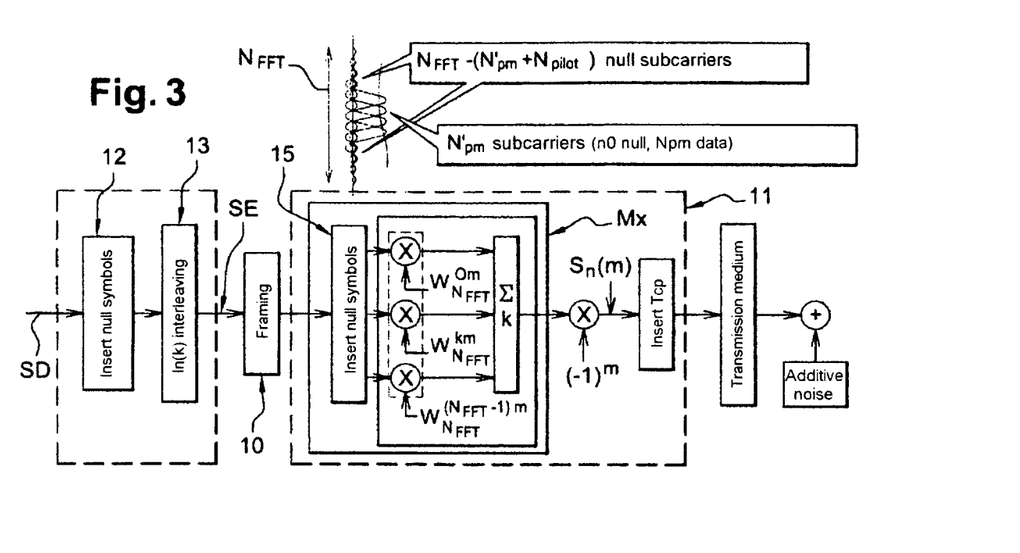
FIG. 3 is a theoretical diagram of a particular implementation of a method of the invention with insertion of n0 null symbols.

FIG. 3 is a diagram showing the principle of a particular implementation of the method of the invention with insertion of n0 null symbols.

The data symbols SD in baseband, made up of n code bits converted in the form of complex signals, are partitioned in groups of Npm contiguous symbols. n0 null symbols are added at 12 with a quasi-symmetrical distribution at the ends of each group of Npm data symbols in order to form a block constituted by N'pm symbols. n0 may typically vary over the range zero to a number $n_{max}$ corresponding to about 10% of the number Npm of data symbols or corresponding typically to $(N_{FFT}-Npm-Npilot)/2$ where Npilot corresponds to the number of pilot symbols per OFDM multiplex dedicated to channel estimation, or to a synchronization or signaling device. This limit $n_{max}$ is set empirically.

In each block of N'pm symbols, the positions of the symbols are indexed by the integer k varying over the range 0 to N'pm−1 and corresponding to the carrier index. An interleaving law In(k) is applied at 13 on each block of N'pm symbols, where In(k) is of size N'pm and of time index n varying over the range 1 to NN', with NN' corresponding to the number of different interleaving laws that are implemented. This law varies over time, once every N OFDM symbols. The N'pm interleaved symbols Se are framed at 10. In accordance with conventional generation of an OFDM signal over time, as implemented using an inverse Fourier transform of size $N_{FFT}$, pilot symbols are optionally added during the framing 10, and n1 null symbols are inserted at 15 in symmetrical manner to the ends of a multiplex constituted by the N'pm+Npilot branches to form an OFDM multiplex Mx having $N_{FFT}$ branches, where $N'pm \leq N_{FFT}$.

Each carrier fk of index k in the OFDM multiplex Mx modulates a symbol of the branch k with the help of the Fourier component:

$$w_{N_{FFT}}^{km} = \exp\left(j2\pi \frac{km}{N_{FFT}}\right)$$

where k varies over the range 0 to $N_{FFT}-1$, under the reserve that the samples are multiplied in alternation by $(-1)^m$ at the output from the inverse Fourier transform, and where m corresponds to the index of the sample at the outlet from the OFDM multiplex Mx.

The number n1 of null symbols added at 15 to the ends of the multiplex Mx after framing at 10 depends on the size $N_{FFT}$ of the inverse direct Fourier transform, IDFT, on the size Npm of a group of data symbols, on the number n0 of null symbols added at 12 to form a block of size N'pm symbols, and on the number Npilot of pilot symbols added during framing at 10, as follows:

$n1 = N_{FFT}-N'pm-Npilot = N_{FFT}-(Npm+n0)-Npilot$

The number of so-called null carriers to which a null symbol is applied is thus equal to n0 plus n1.

Figure 4:
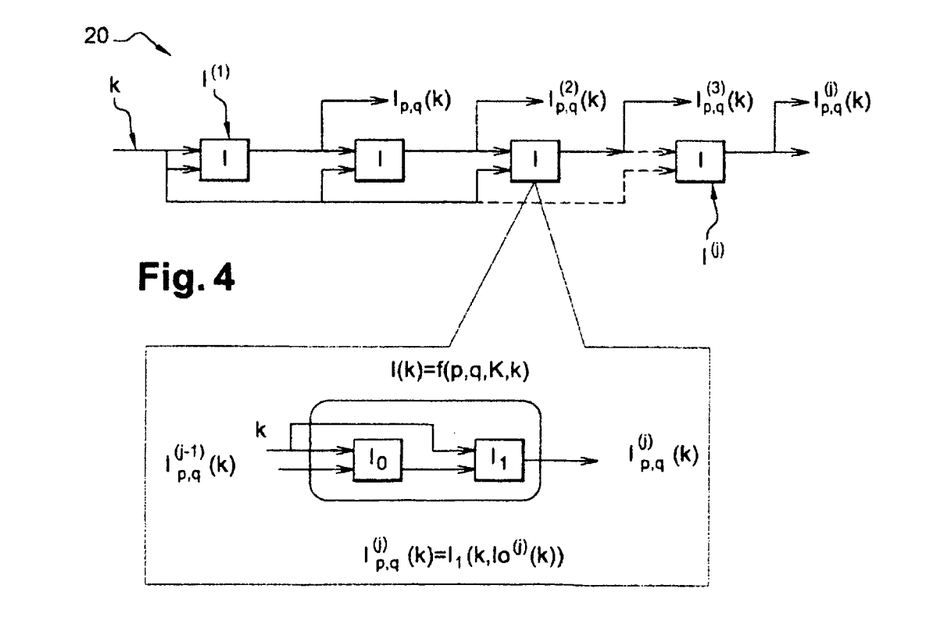
FIG. 4 is a theoretical diagram of an interleaver implementing an iterative interleaving algorithm for obtaining a time-variable interleaving law for a method of the invention.

FIG. 4 is a theoretical diagram of an interleaver device implementing an iterative interleaving algorithm enabling an interleaving law to be obtained that varies over time by modifying the interleaving parameters or the number of iterations for a method of the invention.

The interleaver device 20 implementing the algorithm has as many base cells I as there are iterations. The output from the $j^{th}$ base cell $I_j$ that corresponds to the $j^{th}$ iteration provides an interleaved sequence that is expressed in the form $I_{p,q}^{(j)}(k)$. Implementing the algorithm makes it possible to perform block interleaving of size K with J iterations of index j, J being greater than or equal to 1, on input digital data items indexed by a variable $k = \{0, \ldots, K-1\}$.

Each base cell I of the interleaver device 20 presents the same structure: two inputs, one output, and two individual cells written $I_0$ and $I_1$. Each individual cell $I_0$, $I_1$ has two inputs and one output. The two inputs of individual cell $I_0$ correspond to the two inputs of the base cell I to which it belongs, and the output of the individual cell $I_1$ corresponds to the output of the base cell I to which it belongs. The output from the individual cell $I_0$ is connected to one of the inputs of the individual cell $I_1$. The second input of the individual cell $I_1$ is connected to one of the inputs of the base cell I; this input of the base cell I is fed with the interleaving indices k that are generally presented in the form of a ramp going from 0 to K−1. The second input of the base cell I is connected to the output of the preceding base cell I, except for the first base cell $I_1$ where both inputs are connected together and correspond to the index k.

The interleaving algorithm thus rests on an iterative structure for which the interleaving law depends on three parameters (K, p, q) and on the iteration under consideration j. K corresponds to the size of the block to be interleaved, p and q are two parameters that modify the properties of the interleaver device, in particular the interleaving law and the dispersion. Selecting the iteration serves to modify the interleaving law and the dispersion while conserving a pattern of size p. The variation over time of the interleaving law is obtained by modifying either the iteration, or one of the parameters p and q of the interleaver device.

This interleaving that relies on combining two algebraic functions I0 and I1 of "turbo" structure has the property of preserving a pattern, i.e. of conserving the multiplexing order of p data streams after interleaving. This property turns out to be most advantageous for preserving optimization operations that rely on multiplexing p data items and as performed upstream or downstream from the interleaving operation.

The interleaving law $I_{p,q}^{(j)}(k)$ corresponding to the parameters p and q and to iteration j results from the combination of two algebraic functions, each having two inputs and one output. For iteration j=1, a pattern of size p and a parameter q, this law is expressed by the following equations:

$$I_{o,p,q}(k,k1)=[-k-k_1 \cdot p]_K \, k=\{0,\ldots,K-1\}$$

$$I_{1,p,q}(k,k_1)=[K-p+k+q \cdot p \cdot k_1]_K \, k=\{(0,\ldots,K-1\}$$

$$I_{p,q}(k,k1)=I_1(k,Io(k,k1))$$

and by equation block (2);

$$I_{p,q}(k)=[K-p+k+q \cdot p \cdot I_{p,q}^{0}(k)]_K \, k=\{0,\ldots,K-1\}$$

$$I_{p,q}^{0}(k)=[-k-p \cdot k]_K \quad (2)$$

$$I_{p,q}(k)=[K-p+k+q \cdot p \cdot [-k-p \cdot k]_K]_K \, k=\{0,\ldots,K-1\}$$

For iteration j, equation block (2) has the form:

$$I_0^{(j)}(k)[-k-p \cdot I^{(j-1)}(k)]_K \, k=\{0,\ldots,K-1\}$$

$$I_{p,q}^{(j)}(k)=[K-p+k+q \cdot p \cdot I_0^{(j)}(k)]_K \, k=\{0,\ldots,K-1\} \quad (3)$$

$$I^{(j)}(k)=[K-p+k+q \cdot p \cdot [-k-p \cdot I_{p,q}^{(j-1)}(k)]_K]_K \quad k=\{0,\ldots,K-1\}$$

The interleaved output data sequence Y(k) is related to the input data sequence prior to interleaving X(k) by the following relationship:

$$Y(k)=X(I_{p,q}^{(j)}(k)).$$

The pseudo-periodic and algebraic structure of the algorithm makes it possible to precalculate the dispersion $$\min_{0 \leq k \leq K-1} |I_{p,q}^{(j)}(k+s) - I_{p,q}^{(j)}(k)|$$

between bits or samples separated by s-1 samples.

The dispersion corresponds to the minimum distance between the position indices of the samples separated by s-1 samples of the input sequence after interleaving.

The dispersion $\Delta_{eff} I_{p,q}^{(j)}(s)$ is determined from a polynomial $P_{j,p,q,s}(k)$:

$$P_{j,p,q,s}(k)=I_{p,q}^{(j)}(k+s)-I_{p,q}^{(j)}(k)=s-[q \cdot p \cdot (s+p \cdot P_{j-1,s}(k))]_K$$

$$\Delta_{eff} I_{p,q}^{(j)}(s)=\min_k\{|P_{j,p,q,s}(k)|, K-|P_{j,p,q,s}(k)|\}$$

$$\Delta_{eff} I_{p,q}^{(j)}(s)=\min_k\{|s-[q \cdot p \cdot (s+p \cdot P_{j,p,q,s}(k))]_K|, K-|s-[q \cdot p \cdot (s+p \cdot P_{j,p,q,s}(k))]_K|\} \quad (4)$$

This algebraic function $P_{j,p,q,s}(k)$ depends on the iteration j under consideration, and on the interleaving parameters p and q, where p corresponds to the greatest preserved pattern size and q is a parameter that modifies the interleaving law.

In a particular implementation, the method of the invention comprises such an iterative interleaving algorithm, and a frequency interleaver 9 of the invention comprises such an interleaving device 20, of size K corresponding to the number of symbols per modulated orthogonal symbol, typically OFDM symbol, and thus K=N'pm. The interleaving law varies over time, e.g. every N modulated orthogonal symbols, typically N OFDM symbols, by modifying either the number of iterations, or one of the parameters p and q of the interleaver device for a given transmission mode. The parameters of the iterative interleaving algorithm are thus indexed by a parameter n that is incremented every N OFDM symbols, and that has a maximum value that corresponds to the number of different interleaving laws.

The interleaving law given by equation blocks (2) and (3) is modified to take account of the dynamic nature of this law as follows: $p_n$, $q_n$, and $j_n$ are the parameters selected for the law In(k), and NN' corresponds to the number of laws under consideration.

$$In(k) = I_{p_n,q_n}^{(j_n)}(k) \quad (5)$$

$$I_{p_n,q_n}^{(j_n)}(k) = \begin{bmatrix} N'_{pm} - p_n + k + q_n \cdot p_n \cdot \\ [-k - p_n \cdot I_{p_n,q_n}^{(j_n-1)}(k)]_{N'_{pm}} \end{bmatrix}_{N'_{pm}}$$

$$k = \{0, \ldots, N'_{pm} - 1\}$$

At instant $mT_{SYM}$, the relationship between the index n, specifying a variation in the interleaving law, and the index m associated with transmitting the modulated symbol, typically the OFDM symbol, depends on the number N of modulated symbols, typically OFDM symbols, for which the interleaving law remains unchanged:

$$n = E\left\{\frac{m+N}{N}\right\}, m = \{0, \ldots, n \cdot N - 1\} \quad (6)$$

where E{x} designates the integer portion of x.

Figure 5:
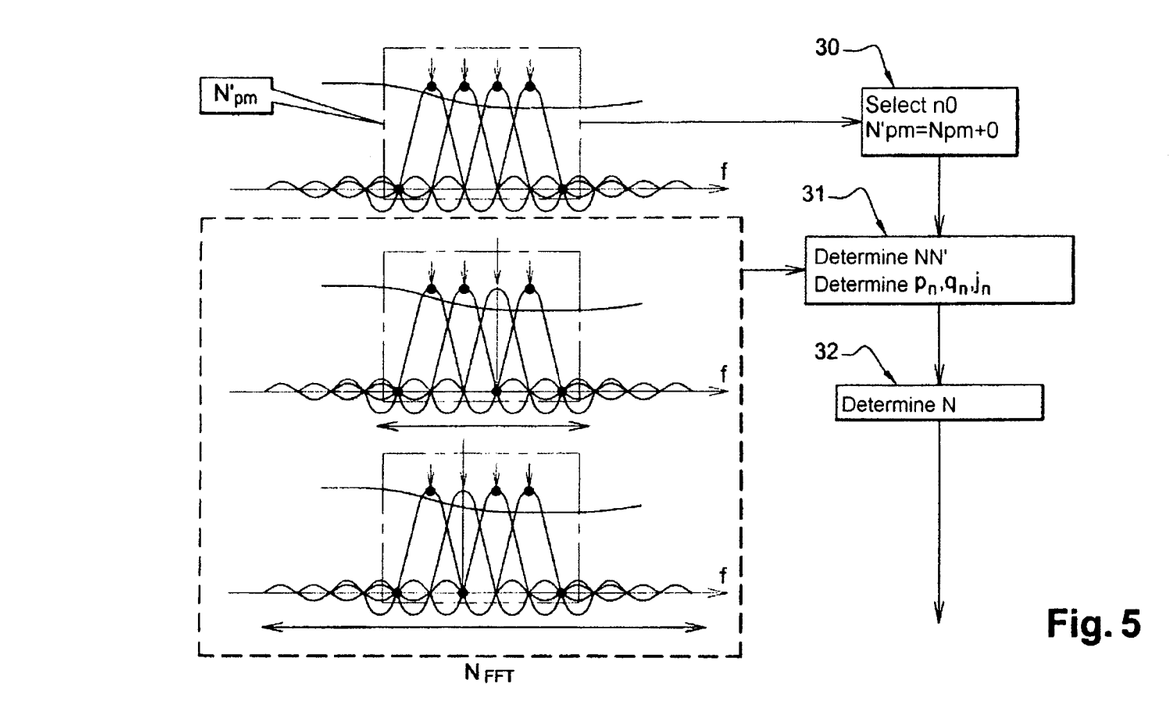
FIG. 5 is a graphical representation showing a particular element of optimizing interleaving according to an embodiment of the invention.

The following example corresponding to FIG. 5 serves to illustrate optimization of a particular implementation of a method of the invention. In a first step 30, the optimization of the method consists in defining the number n0 of null symbols to be added in the frequency interleaving method in order to define the size N'pm of the block to be interleaved. The number n0 is adjusted empirically as a function of the properties of the transmission channel, of the modulation under consideration, of the radio performance of the link, and on the channelization of the system (transmission band of the transmitted signal). In practice, n0 is selected to be no greater than half the total number of null carriers conventionally added to the ends of the orthogonal multiplex.

$$n0 \leq (N_{FFT}-Npm-Npilot)/2, N'pm=Npm+n0$$

If the system has too small a number of null carriers added conventionally to the ends of the orthogonal multiplex, or if it does not have any, then no null symbol is added during the frequency interleaving, and N'pm=Npm. The invention then consists in performing frequency interleaving of the data symbols of size M that is a multiple of Npm, that varies over time, e.g. every N modulated orthogonal symbols, typically N OFDM symbols.

A second optimization step 31 consists in determining the number NN' and the type of interleaving law In(k) to be implemented using the iterative algorithm described with reference to FIG. 4. This algorithm generates an interleaving law of index n that is less than or equal to NN', firstly depending on a parameter $p_n$ that preserves a pattern and modifies dispersion, and secondly depending on a parameter $q_n$ and an iteration $j_n$ that modify dispersion. The number NN' of different laws is defined as a function of the possible values for the parameter $p_n$, which is a submultiple of the size N'pm or M of the interleaving block, depending on whether or not null carriers are inserted in the block to be interleaved, and as a function of the dispersion associated with the different iterations of the algorithm. $p_n$ must always be a submultiple of the size of the interleaving block. Two configurations can arise. First configuration: there is no constraint associated with regrouping pattern-conserving carriers in the OFDM multiplex. The different values possible for $p_n$ are then the submultiples of the size of the block to be interleaved. The size of the block to be interleaved is equal to N'pm when null carriers are inserted and it relates to a single orthogonal multiplex, or else it is equal to M and it relates to data symbol interleaving performed on a plurality of modulated orthogonal symbols. The value selected for $p_n$ is governed by the value for the dispersion associated with iteration j that gives the greatest dispersion between adjacent carriers and carriers separated by s-1 carriers. Second configuration: there exists a constraint associated with grouping pattern-conserving carriers of size p1. The value of $p_n$ selected for interleaving must then be a multiple of p1 and is preferably equal to p1. For this second configuration, the values of the parameter $q_n$ and of the iteration $j_n$ are selected to increase the interleaving dispersion between carriers separated by s-1 carriers. In practice, s is less than three in order to ensure decorrelation between adjacent carriers.

During a third step 32, the value of N is determined as a function of the properties of the channel and of the size of the block to be interleaved and of the number of interleaving laws NN' that are taken into consideration.

Figure 6:
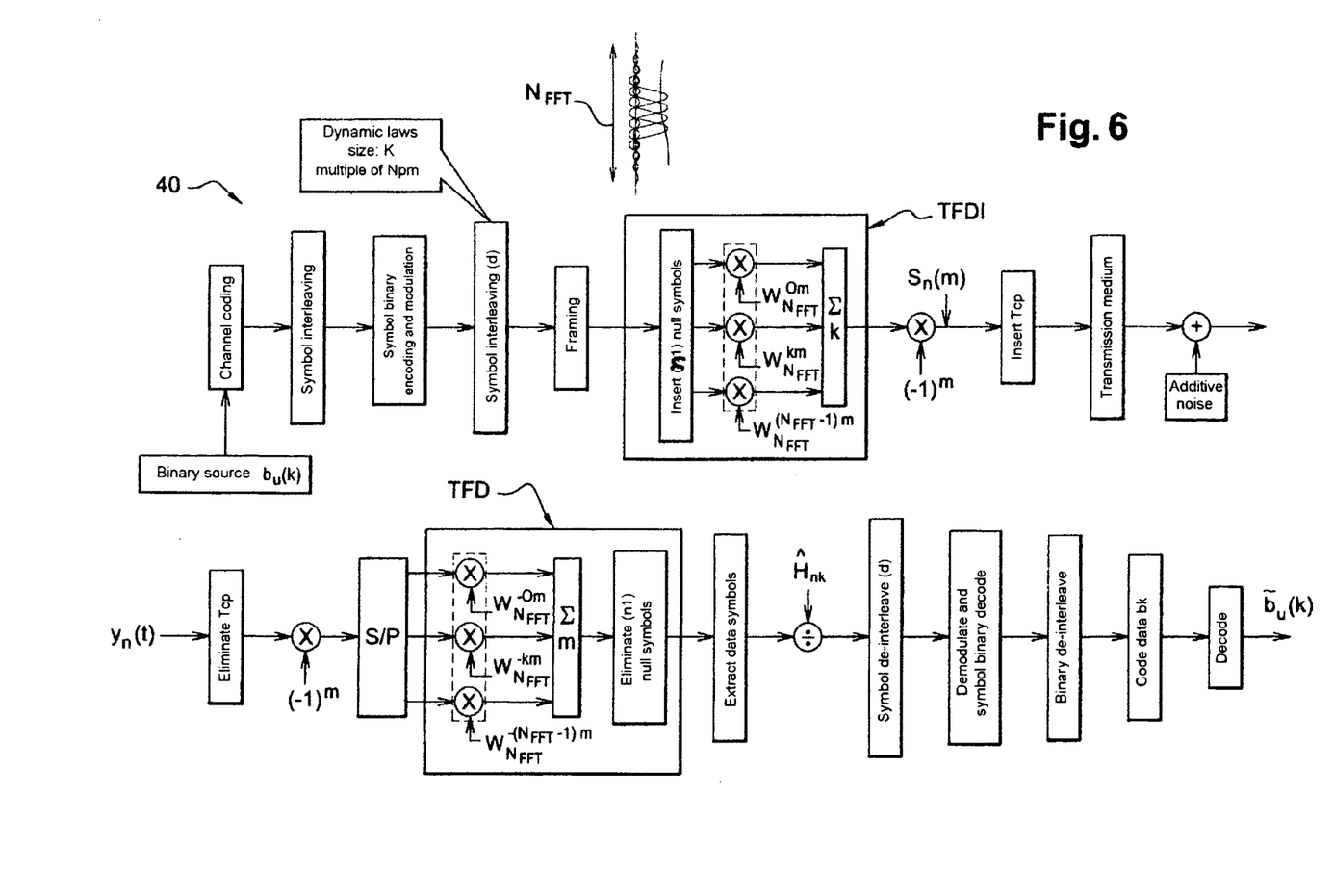
FIG. 6 is a diagram showing a first implementation of interleaving of the invention in a particular OFDM transceiver system.
Figure 7:
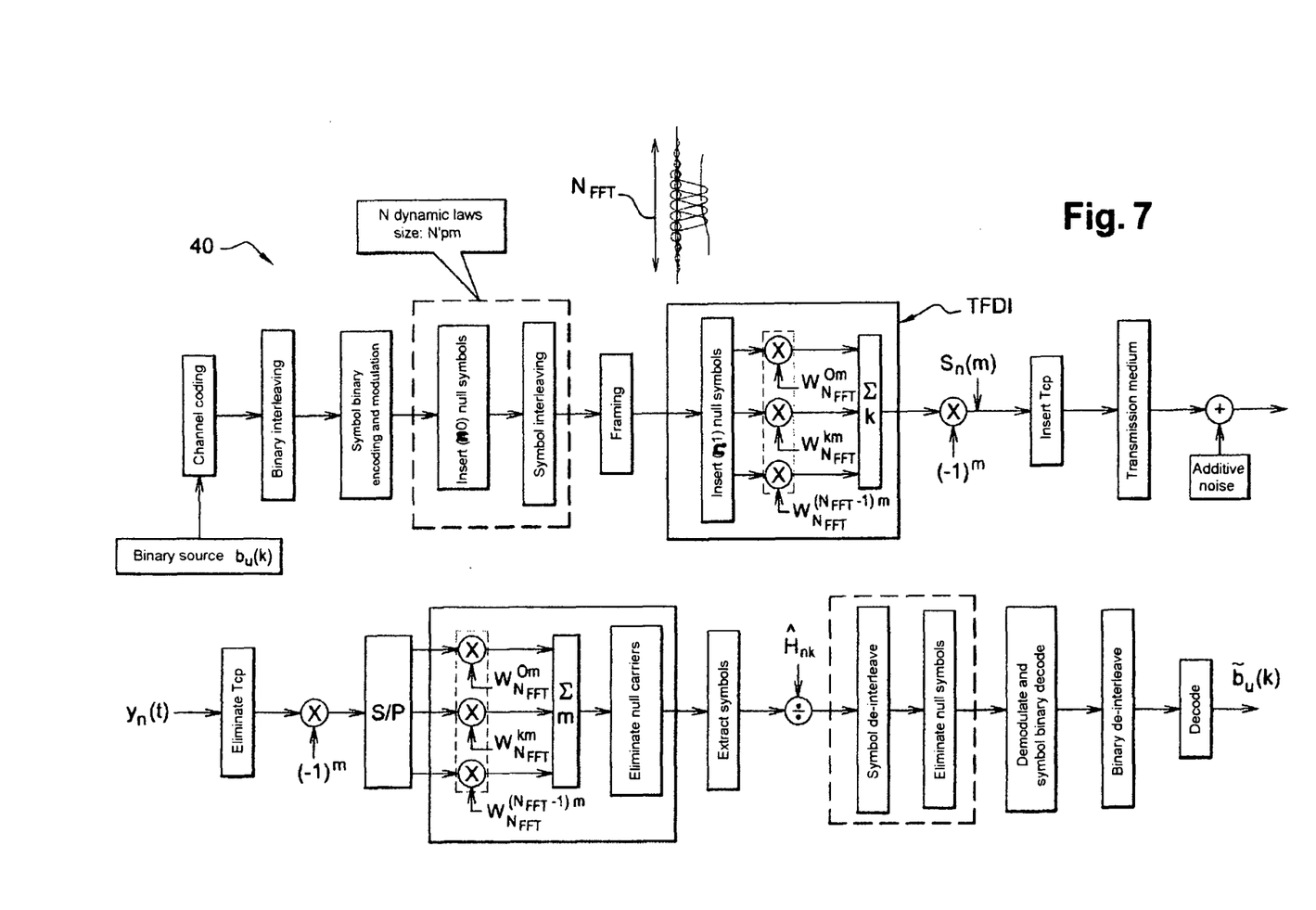
FIG. 7 is a diagram showing a second implementation of interleaving of the invention in a particular OFDM transceiver system.

An implementation of the interleaving method of the invention is described below with reference to the diagrams of FIGS. 6 and 7 showing an OFDM transceiver system implementing such a method.

The OFDM transceiver radio system 40 operates in the millimeter band at 60 GHz. The system implements OFDM modulation for which QPSK data symbols and 16-QAM symbols are transmitted on Npm carriers. The size of the inverse discrete Fourier transform IDFT is greater than Npm and enables null carriers to be added. In a first described example, corresponding to FIG. 6, and corresponding to a configuration V0, no null carrier is incorporated in the OFDM multiplex band and the size of the FFT is unchanged, the frequency interleaving method of the invention serving to interleave data symbols only, without adding any null symbols. In a second described example, corresponding to FIG. 7, and to a configuration V1, null carriers are incorporated in the OFDM multiplex band by a frequency interleaving method of the invention. In each of these two examples, two different transmission modes are taken into consideration:
  a first mode defined by a transmission bandwidth greater than 500 MHz, corresponding to ultra wide band (UWB) transmission; and
  a second mode defined by a bandwidth of 200 MHz corresponding to a so-called wide band (WB).

For these two transmission bands, OFDM parameters are determined such that the ratio x between the duration of the useful OFDM symbol $T_{FFT}$ and the size of the cyclic prefix $T_{CP}$ is close to the value eight. Furthermore, the size of the cyclic prefix is imposed by the maximum excursion of the delays of the power profile of the propagation channel $P(\tau)$ and is about 177 ns. $P(\tau)$ is given by:

$$P(\tau) = <|h(t,\tau)|^2>_t = \sum_i <a_{i,n}>_n \cdot \delta(\tau - <\tau_{i,n}>_n) \quad (7)$$

where $<x>_t$ represents the mean time value of the signal x depending on the variable t. t represents delays. After discrete sampling of the impulse response $h(t,\tau)$ of the channel, the variable n is allocated to the variable t, and the variable i is allocated to the delays $\tau i$.

This thus imposes an intercarrier spacing $\Delta FFT$ that is practically identical for both transmission modes ($\Delta FFT = T_{FFT}^{-1} = (xT_{cp})^{-1}$). Only the number of data carriers is modified as a function of the size of the band.

Implementing a frequency interleaving method of the invention leads to defining a frequency interleaving size (that depends on the size of the FFT, on the number Npm of data carriers, and on the number n0 of null carriers) for each transmission mode (UWB and WB). Four frequency interleaving sizes are thus considered for the two examples described.

The useful bits coming from the source are encoded using a convolutional code of rate ⅓ and of constraint length M=7 with the help of generator polynomials $\{g0, g1, g2\}=\{133_0, 145_0, 171_0\}$. This code is punctured to produce a code rate r=5/8. The encoded data (code bits) are interleaved using a matrix interleaver having two stages derived from the specifications of the MBOA standard. The interleaved data are put into form with the help of a symbol binary encoding operation in order to form data symbols in the complex domain. The modulation is of constant envelope with two phase states (QPSK) and with phase and amplitude modulation having 16 states.

These symbols are then interleaved using a frequency interleaving method of the invention.

The OFDM parameters are described by the number of data carriers taken into account (Npm), the size of the Fourier transform ($N_{FFT}$), the sampling frequency (Fe), and the duration of the guard interval or cyclic prefix Tcp. These four parameters serve to determine the useful duration ($T_{FFT}$) of the OFDM symbol, the total duration ($T_{SYM}$) of the OFDM symbol with the cyclic prefix, the intercarrier spacing $\Delta_{FFT}$, the data flow, etc. . . .

$$T_{FFT} = \frac{F_e}{N_{FFT}}, \Delta_F = \frac{1}{T_{FFT}} \quad (8)$$

$$T_{SYM} = T_{FFT} + T_{CP} = (x+1)T_{CP}$$

$$Du = \frac{mR \cdot Npm}{T_{SYM}} = \frac{mR \cdot Npm \cdot (1-ro)}{(x+1) \cdot T_{CP}} \text{(data flow)}$$

$$\frac{Du}{B_T} = \frac{mR \cdot Npm \cdot (1-ro)}{(x+1) \cdot T_{CP}} \cdot \frac{xT_{CP}}{N_{FTT}} = mR \cdot \frac{N_{pm}}{N_{FTT}} \cdot \frac{x}{x+1}(1-ro)$$

$$\text{Eff\_Useful spectrum} = \frac{Du}{Bw} = mr \cdot \frac{x}{x+1} \cdot (1-ro)$$

The OFDM parameters are given in Table 1 in Appendix 1.

For WB mode, 280 data carriers are considered and 40 null carriers are used in the frequency interleaving method of the invention. The size of the FTT, $N_{FFT}$, is 360. The two matrix sizes to be taken into consideration are thus Npm=280 (configuration V0) and N'pm=320 (configuration V1). The ratio between the number of data carriers and the number of null carriers is seven.

For UWB mode, 736 data carriers are taken into consideration and 16 null carriers are used in the frequency interleaving method of the invention. The matrix sizes to be taken into consideration are then Npm=736 (configuration V0) and N'pm=752 (configuration V1).

Configuration V0 corresponds to an implementation of a method of the invention in which only dynamic interleaving of data symbols is performed without any null symbols being added. In this configuration, an interleaving matrix of size Npm is generated to produce dynamic interleaving. The variation law of the matrix is modified on each OFDM symbol with the help of the iterative interleaving algorithm described above with reference to FIG. 4, so two permutations I1($k$) and I2($k$) are taken into consideration. Table 2 in Appendix 2 gives, for WB mode, the various possible values for p, for constant q of value 2, for three possible iterations, and for each size Npm. Table 3 in Appendix 2 gives the various possible values for p, for constant q of value 2, for three possible iterations, and for each size Npm for UWB mode.

Configuration V1 corresponds to an implementation of the method of the invention in which null symbols are inserted and N'pm symbols are interleaved dynamically. For this configuration, an interleaving matrix of size N'pm is generated to produce dynamic interleaving. The law whereby this matrix is varied is modified on each OFDM symbol with the help of the iterative interleaving algorithm described above with reference to FIG. 4, so two permutations I1($k$) and I2($k$) are considered. Table 4 in Appendix 3 gives the various possible values for p, for constant q having the value 2, for three possible iterations, and for each size N'pm, in WB mode. Table 5 in Appendix 3 gives the various possible values for p, for constant q of value 2, for three possible iterations, and for each size N'pm, in UWB mode.

The parameters selected for the laws I1($k$) and I2($k$) are those that maximize dispersion. The values selected for p and j are those that provide maximum dispersion between adjacent carriers and between two carriers spaced apart by one subcarrier (s=2). For example, in WB mode and for the two sizes of matrix, the following values can be selected: p=10, q=2, and iterations j=1 or 2. In UWB mode for size Npm=736, the values {p=4, j=2} and {p=16, j=1}, can be selected and for size N'pm=752, the values p=16 and j=1 or 3 can be selected. When making the selection, the dispersion is taken into consideration, and so also is the distribution of the samples. In some configurations, two different interleaving laws can present the same dispersion. The law selected must present a different interleaving pattern.

A method of the invention can be implemented by various means. For example, the method can be implemented in hardware form, in software form, or in a combination of both.

In a hardware implementation, the frequency interleaver 9 or some of the elements of the frequency interleaver 9 used for performing the following steps in the transmitter (e.g. the interleaver device 20) can be integrated in one or more application specific integrated circuits (ASICs), in digital signal processors (DSPs, DSPDs), in programmable logic circuits (PLDs, FPGAs), in controllers, microcontrollers, microprocessors, or any other electronic component designed to execute the above-described functions.

For a software implementation, some or all of the steps (referenced 12, 13, and in some implementations 30, 31, 32) of an interleaving method can be implemented by modules that execute the above-described functions. The software code can be stored in a memory and executed by a processor. The memory may form part of the processor or it may be external to the processor and coupled thereto by means known to the person skilled in the art.

Consequently, the invention also provides a computer program, in particular a computer program on or in a data medium or memory, suitable for implementing the invention. The program can make use of any programming language, and may be in the form of source code, object code, or code that is intermediate between source code and object code, such as in a partially compiled form, or in any other form that is desirable for implementing a method of the invention.

The data medium may be any kind of entity or device capable of storing the program. For example, the medium may comprise storage means such as a read-only memory (ROM), e.g. a CD-ROM, or a microelectronic circuit ROM, or indeed magnetic recording means, such as a floppy disk, or a hard disk.

Furthermore, the data medium may be a transmissible medium such as an electrical or optical signal, that can be conveyed via an electrical or optical cable, by radio, or by other means. The program of the invention may in particular be downloaded from an Internet type network.

APPENDIX 1

TABLE 1

OFDM parameters

| System parameters | WB mode | UWB mode |
|---|---|---|
| FFT size | 360 | 768 |
| Sampling frequency Fe (MHz) | 256 | 528 |
| Useful bandwidth Bw (MHz) | 199.5 | 506.01 |
| Npm: number of data subcarriers per OFDM symbol | 280 | 736 |
| $\Delta_F$: intercarrier spacing (MHz) | 0.710 | 0.69 |
| $T_{FFT}$: useful duration of OFDM symbol (ns) | 1406 | 1454 |
| $T_{CP}$: cyclic prefix duration (ns) | 176 | 178 |
| $x = T_{FFT}/T_{CP}$ | 8 | 8.17 |
| $T_{SYM}$: total duration of OFDM symbol (ns) | 1582 | 1632 |
| Binary interleaving period ($\lambda/n$)/µs | ($\lambda$/527) 9.49 | ($\lambda$/527) 9.47 |
| Ratio of pilots in the frame | 1/7 | 1/7 |
| $10 * \text{Log}_{10}(T_{FFT}/T_{SYM})$ (db) | −0.51 | −0.501 |

APPENDIX 2

TABLE 2

Possible values for the interleaving matrices for WB mode (configuration V0)

| size K | p | q | $\Delta I$ (s = 1) | $\Delta I$ (s = 2) | $\Delta I^{(2)}$ (s = 1) | $\Delta I^{(2)}$ (s = 2) | $\Delta I^{(3)}$ (s = 1) | $\Delta I^{(3)}$ (s = 1) |
|---|---|---|---|---|---|---|---|---|
| 280 | 4 | 2 | 39 | 78 | 121 | 38 | 41 | 34 |
| 280 | 7 | 2 | 111 | 58 | 55 | 110 | 57 | 44 |
| 280 | 10 | 2 | 61 | 122 | 101 | 78 | 59 | 78 |
| 280 | 14 | 2 | 139 | 2 | 139 | 2 | 139 | 114 |
| 280 | 20 | 2 | 1 | 2 | 1 | 2 | 1 | 38 |
| 280 | 28 | 2 | 57 | 114 | 111 | 58 | 113 | 58 |
| 280 | 40 | 2 | 81 | 118 | 1 | 2 | 81 | 2 |

TABLE 3

Possible values for the interleaving matrices for UWB mode (configuration V0)

| size K | p | q | $\Delta I$ (s = 1) | $\Delta I$ (s = 2) | $\Delta I^{(2)}$ (s = 1) | $\Delta I^{(2)}$ (s = 2) | $\Delta I^{(3)}$ (s = 1) | $\Delta I^{(3)}$ (s = 1) |
|---|---|---|---|---|---|---|---|---|
| 736 | 4 | 2 | 39 | 78 | 231 | 274 | 25 | 18 |
| 736 | 8 | 2 | 143 | 286 | 111 | 222 | 209 | 194 |
| 736 | 16 | 2 | 193 | 350 | 223 | 290 | 65 | 34 |
| 736 | 32 | 2 | 97 | 194 | 1 | 2 | 97 | 34 |

APPENDIX 3

TABLE 4

Possible values for the interleaving matrices for WB mode (configuration V1)

| size K | p | q | ΔI (s = 1) | ΔI (s = 2) | ΔI$^{(2)}$ (s = 1) | ΔI$^{(2)}$ (s = 2) | ΔI$^{(3)}$ (s = 1) | ΔI$^{(3)}$ (s = 1) |
|---|---|---|---|---|---|---|---|---|
| 320 | 4 | 2 | 39 | 78 | 39 | 78 | 39 | 46 |
| 320 | 8 | 2 | 143 | 34 | 49 | 98 | 113 | 98 |
| 320 | 10 | 2 | 101 | 118 | 59 | 118 | 59 | 78 |
| 320 | 16 | 2 | 97 | 126 | 95 | 130 | 31 | 62 |
| 320 | 20 | 2 | 121 | 78 | 121 | 78 | 121 | 82 |
| 320 | 32 | 2 | 129 | 62 | 65 | 130 | 63 | 126 |

TABLE 5

Possible values for the interleaving matrices for UWB mode (configuration V1)

| size K | p | q | ΔI (s = 1) | ΔI (s = 2) | ΔI$^{(2)}$ (s = 1) | ΔI$^{(2)}$ (s = 2) | ΔI$^{(3)}$ (s = 1) | ΔI$^{(3)}$ (s = 1) |
|---|---|---|---|---|---|---|---|---|
| 752 | 4 | 2 | 39 | 78 | 263 | 226 | 137 | 130 |
| 752 | 8 | 2 | 143 | 286 | 241 | 270 | 31 | 46 |
| 752 | 16 | 2 | 209 | 334 | 255 | 242 | 319 | 350 |
| 752 | 47 | 2 | 1 | 2 | 1 | 2 | 1 | 92 |

The invention claimed is:

1. A method of frequency interleaving symbols that are to be allocated to carriers of a multicarrier transmitter device comprising a module for multiplexing and modulation by $N_{FFT}$ orthogonal functions, the method comprising:
   encoding binary bits to form modulated data symbols;
   partitioning the modulated data symbols into blocks of modulated data symbols;
   obtaining an interleaving law I(k) by selecting a number of iterations j or by selecting parameters p, q of the iterative interleaving algorithm:

$$I_{o,p,q}(k)=[-k-p\cdot k]_K I(k)=I_{p,q}^{(j)}(k)=[K-p+k+q\cdot p\cdot [-k-p\cdot I_{p,q}^{(j-1)}(k)]_K]_K=\{0,\ldots,K-1\}, j\geq 1,$$

varying over time the interleaving law generated by modifying over time the number of iterations j or one of the two parameters p and q for a given transmission mode of the multicarrier transmitter device; and
      interleaving the blocks of K modulated data symbols through application of the obtained time-variable interleaving law.

2. The frequency interleaving method according to claim 1, wherein the time-variable interleaving law is obtained by selecting one law from a plurality of interleaving laws generated by means of the iterative interleaving algorithm.

3. The frequency interleaving method according to claim 1, wherein the variation over time in the interleaving law takes place as a function of the value of a time index associated with the modulated orthogonal symbols generated by the module for multiplexing and modulation by $N_{FFT}$ orthogonal functions.

4. The frequency interleaving method according to claim 1, wherein the time variation of the interleaving law takes place every N modulated orthogonal symbols generated by the module for multiplexing and modulation by $N_{FFT}$ orthogonal functions, N being a determined parameter.

5. The frequency interleaving method according to claim 1, wherein the blocks of modulated data symbols for interleaving are of size Npm less than the number $N_{FFT}$ of orthogonal functions of a module for multiplexing and modulation.

6. The frequency interleaving method according to claim 1, wherein the multicarrier transmitter device has $N_{FFT}$ carriers including Npm data carriers, Npilot pilot carriers, and u carriers having a null value allocated thereto where:

$$N_{FFT}=Npm+Npilot+u$$

the interleaving law being applied to Npm successive modulated data symbols together with n0 null symbols, where $0 \leq n0 \leq u$, and u and n0 being determined parameters.

7. The frequency interleaving method according to claim 6, wherein the modulated data symbols allocated to the data carriers form frequency components of a signal transmitted by the multicarrier transmitter device, and in which the number n0 of null symbols is determined as a function of the correlation properties of a transmission channel of the transmitted signal.

8. The frequency interleaving method according to claim 1, wherein the blocks of modulated data symbols for interleaving are of size M greater than the number $N_{FFT}$ of orthogonal functions of the module for multiplexing and modulation, M being a determined parameter.

9. The frequency interleaving method according to claim 8, in which the time variation of the interleaving law takes place every N' blocks of M modulated data symbols, with 0<N'.

10. The frequency interleaving method according to claim 1, wherein the multicarrier transmitter device has $N_{FFT}$ carriers including Npm data carriers, in which the time variation of the interleaving law takes place every N modulated orthogonal symbols generated by the module for multiplexing and modulation, N being a determined parameter, and in which the size M of the blocks of modulated data symbols for interleaving is a multiple of the number Npm of data carriers and a submultiple of N.

11. A non-transitory computer readable medium including a program having program instructions adapted to implement the method according to claim 1 for frequency interleaving symbols when said program is loaded into an electronic device and executed.

12. An article of manufacture having a non-transitory computer readable medium storing a computer program including software code portions for executing steps of a method according to claim 1 when the program is executed by an electronic device.

13. A frequency interleaver of symbols that are to be allocated to carriers in a multicarrier transmitter device comprising a module for multiplexing and modulation by $N_{FFT}$ orthogonal functions to interleave blocks of modulated data symbols through application of a time-variable interleaving law, the blocks of modulated data symbols being formed by encoding binary bits to form modulated data symbols and partitioning the modulated data symbols into the blocks of modulated data symbols, the frequency interleaver comprising:
   a calculator device for calculating the interleaving law such that the interleaving law varies over time for a given transmission mode of the multicarrier transmitter device, the calculator device comprising a block interleaver device of size K with J iterations of index j, J being greater than or equal to 1, for interleaving the blocks of modulated data symbols indexed by a variable k= {0, . . . , K−1}, the device comprising J cells with each being designated as I and having two-inputs and one-output such that each base cell I is made up of two individual cells $I_0$ and $I_1$ each having two inputs and one output and respectively implementing two modulo-K algebraic functions $I_{0,p,q}(k,k1)$ and $I_{1,p,q}(k,k_1)$ having two inputs and one output, for determined parameters p and q, the output of the base cell I corresponding to the output of the individual cell $I_1$, the two inputs of the base cell $I_0$ corresponding to the two inputs of the individual cell $I_0$, the output of the individual cell $I_0$ corresponding to a first input of the individual cell $I_1$, the second input of the individual cell $I_1$ being connected to a first input of the individual cell $I_0$ that corresponds to a first input of the base cell I;

in which both inputs of the first base cell I are connected together and correspond to the index k;

in which the output of each base cell I is connected to the second input of the base cell I of the following iteration;

in which the first inputs of the base cells I are interconnected; and in which the output from the cell J determines the interleaving function I(k) as being the combination of the two algebraic functions:

$$I(k)=I_{p,q}^{(j)}(k)=I_1(k,I_0^{(j)}(k)) \text{ with } k=\{0,\ldots,K-1\}, k1=k$$

when j equals one.

14. The frequency interleaver according to claim 13, wherein the two modulo-K algebraic functions having two inputs and one output, of for determined parameters p and q, have the following expressions respectively:

$$I_{0,p,q}(k,k1)=[-k-k_1 \cdot p]_k$$

and $$I_{1,p,q}(k,k_1)=[K-p+k+q \cdot p \cdot k_1]_K.$$

15. A transmitter device including the frequency interleaver according to claim 13.

16. A frequency interleaver for interleaving symbols of position index k, to interleave a block of symbols in application of a determined interleaving law I(k), comprising a block interleaver device of size K, for determined parameters p and q, having two inputs and one output implementing in cascade a first modulo-K algebraic function having two inputs $I_{0,p,q}(k,k1)$ and a second modulo-K algebraic function having two inputs $I_{1,p,q}(k,k_1)$, including one input that is equal to the position index k of the symbols prior to interleaving and a second input fed with the output of the preceding iteration, the output from iteration J determining the interleaving function I(k) as being the combination of the following two algebraic functions:

$$I(k)=I_{p,q}^{(j)}(k)=I_1(k,I_0^{(j)}(k)) \text{ with } k=\{0,\ldots,K-1\}, k_1=k$$

when j equals one, J being greater than or equal to 1, to cause the frequency interleaving of the symbols to vary over time as a function of the values selected over time for J, p, q, or K.

17. A transmitter device including a frequency interleaver according to claim 16.

18. A receiver device including a deinterleaving module for deinterleaving demodulated symbols in application of a law that is the inverse of an interleaving law I(k), the deinterleaving module being suitable for calculating at determined instants the deinterleaving law, wherein the interleaving law I(k) having been obtained by selecting a number of iterations j or by selecting parameters p, q of the iterative interleaving algorithm:

$$I_{o,p,q}(k)=[-k-p \cdot k]_K$$

and $$I(k)=I_{p,q}^{(j)}(k)=[K-p+k+q \cdot p \cdot [-k-p \cdot I_{p,q}^{(j-1)}(k)]_K]_K$$

$k=\{0,\ldots,K-1\}, j \geq 1$ and K is the size of a block of modulated symbols, a time variation of the interleaving law I(k) resulting from a modification over time of either the number of iterations j or one of the two parameters p and q for a given transmission mode of a multicarrier transmitter device.

19. A method of reception implemented by a receiver device including a deinterleaver module performing deinterleaving of demodulated symbols in application of a law that is the inverse of an interleaving law I(k) by acting at determined instants to calculate the deinterleaving law, the interleaving law I(k) having been obtained by selecting a number of iterations j or by selecting parameters p, q of the iterative interleaving algorithm:

$$I_{o,p,q}(k)=[-k-p \cdot k]_K$$

and $$I(k)=I_{p,q}^{(j)}(l)=[K-p+k+q \cdot p \cdot [-k-p \cdot I_{p,q}^{(j-1)}(k)]_K]_K$$

$k=\{0,\ldots,K-1\}, j \geq 1$ and K is the size of a block of modulated symbols, a time variation of the interleaving law/(k) resulting from a modification over time of either the number of iterations j or one of the two parameters p and q for a given transmission mode of a multicarrier transmitter device.

\* \* \* \* \*